United States Patent [19]

Youngerth

[11] Patent Number: 5,289,418
[45] Date of Patent: Feb. 22, 1994

[54] MEMORY APPARATUS WITH BUILT-IN PARITY GENERATION

[75] Inventor: Al Youngerth, Boise, Id.

[73] Assignee: Extended Systems, Inc., Boise, Id.

[21] Appl. No.: 837,397

[22] Filed: Feb. 14, 1992

[51] Int. Cl.$^5$ .................. G11C 7/00; G11C 29/00
[52] U.S. Cl. ..................... 365/201; 371/40.2
[58] Field of Search ............. 371/40.1, 40.2; 365/201

[56] References Cited

U.S. PATENT DOCUMENTS

| | | | |
|---|---|---|---|
| 4,654,819 | 3/1987 | Stiffler et al. | 395/425 |
| 4,884,271 | 11/1989 | Concha et al. | 371/40.2 |
| 4,958,352 | 9/1990 | Noguchi et al. | 371/40.1 |
| 4,989,210 | 1/1991 | Scheuneman et al. | 371/40.1 |
| 4,996,690 | 2/1991 | George et al. | 371/40.1 |
| 5,012,472 | 4/1991 | Arimoto et al. | 371/40.1 |
| 5,172,339 | 12/1992 | Noguchi et al. | 365/201 |
| 5,191,581 | 3/1993 | Woodbury et al. | 307/455 |

Primary Examiner—Eugene R. LaRoche
Assistant Examiner—Michael C. Kessell
Attorney, Agent, or Firm—Townsend and Townsend Khourie and Crew

[57] ABSTRACT

The present invention provides a dedicated memory circuit which supports the generation of parity data in connection with the storing of data. This improved memory circuit allows the parity generation to be done remotely from the CPU while consuming less time. The memory array is provided with its data output being connected to combinational logic. Another input to combinational logic is for external data. The data already in the array and the new data are combined to the combinational logic, preferably an exclusive-or arrangement, to produce the parity data which is then returned to the memory array. A latch is provided between the exclusive-or logic and the memory array data lines to allow isolation of the data during the two cycles of the read out of the array and the right back to the array after the exclusive-or.

11 Claims, 6 Drawing Sheets

XWRITE 1ST CYCLE

FIG. 6A.

XWRITE 2ND CYCLE

MEMORY APPARATUS WITH BUILT-IN PARITY GENERATION

BACKGROUND OF THE INVENTION

The present invention relates to systems for storing data and generating parity data to allow reconstruction of lost data, and in particular to systems using arrays of disk drives.

Redundant Arrays of Inexpensive Disks (RAID) is a relatively new technology for increasing the reliability and performance of disk storage systems. RAID increases the performance of disk subsystems by using many small, inexpensive disk drives in tandem. RAID increases the reliability of disk subsystems by storing redundant data on one or more of the disk drives in the system. In the event of a disk failure, the redundant data can be used to reconstruct the data on the failed drive.

One method for generating redundant data is block parity. Block parity is the exclusive-or operation of two or more blocks of data. If one block of data is lost, it can be recreated by the bit-wise exclusive-or operation of the remaining data blocks and the parity block.

Figure 1:
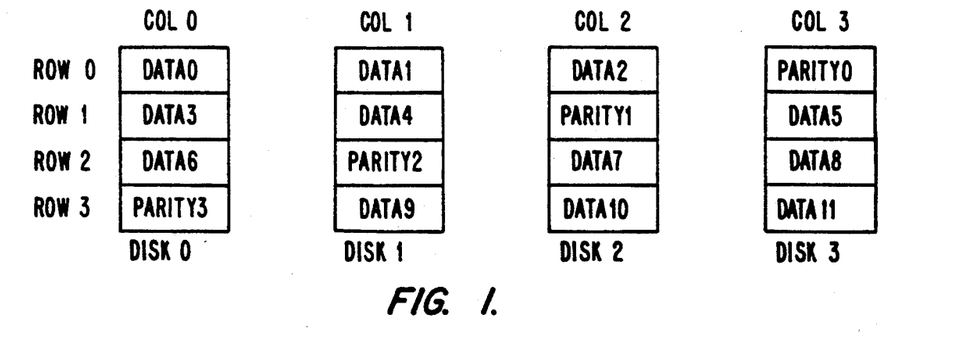
FIG. 1 is an illustration of the prior art block parity data distribution.

One method for implementing RAID (RAID 5) spreads parity blocks across all the disks in the array. An array can be viewed as a series of rows and columns. The individual disks are the columns and the rows make up the blocks. Blocks are made up of one or more physical disk sectors (which are typically 512 bytes in size). Each row has data blocks and a single parity block. FIG. 1 shows the parity blocks spread across the columns in a Left-Symmetrical format.

The parity block for any row in the array is generated by the exclusive-or of all the data blocks in the row. If, for example, column (disk) 2 fails, Rows 0, 2, and 3 lose data blocks and Row 1 loses its parity block. For Row 1, no data is lost but the parity block can no longer be updated. For Rows 0, 2, and 3, access to the data blocks in the failed column requires the data to be reconstructed for the failed data block. This can be done by reading the other data blocks and parity block in the row and performing an exclusive-or. The result of the operation is the data for the failed data block.

Figure 2A:
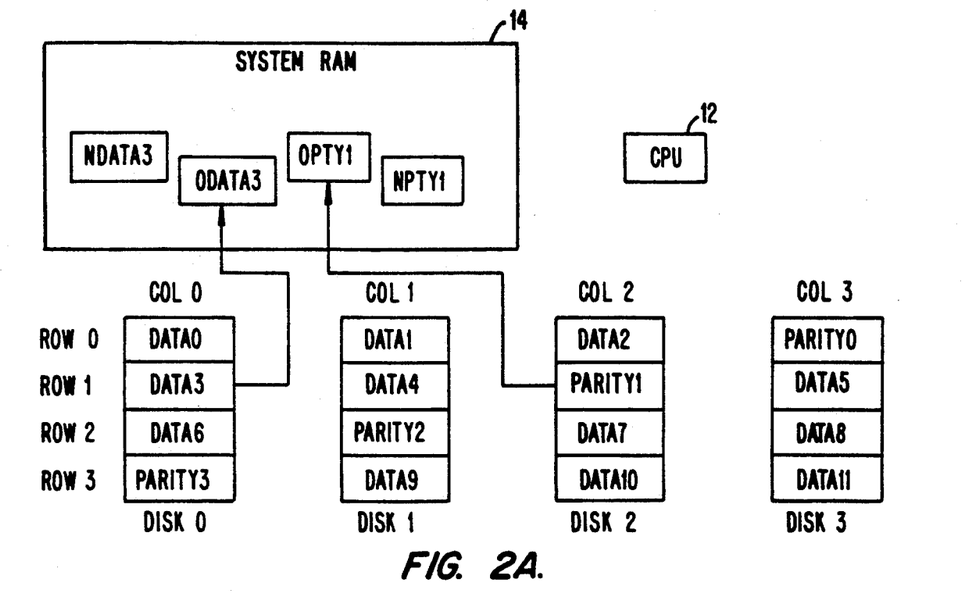
FIGS. 2A-2C illustrate a prior art parity generation procedure for a read-modify-write operation.
Figure 2B:
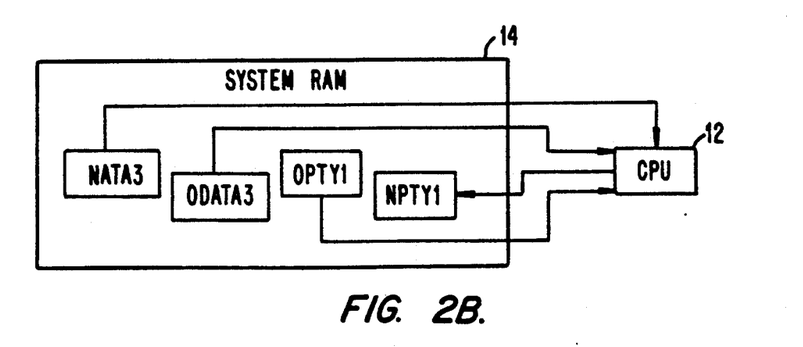
Figure 2C:
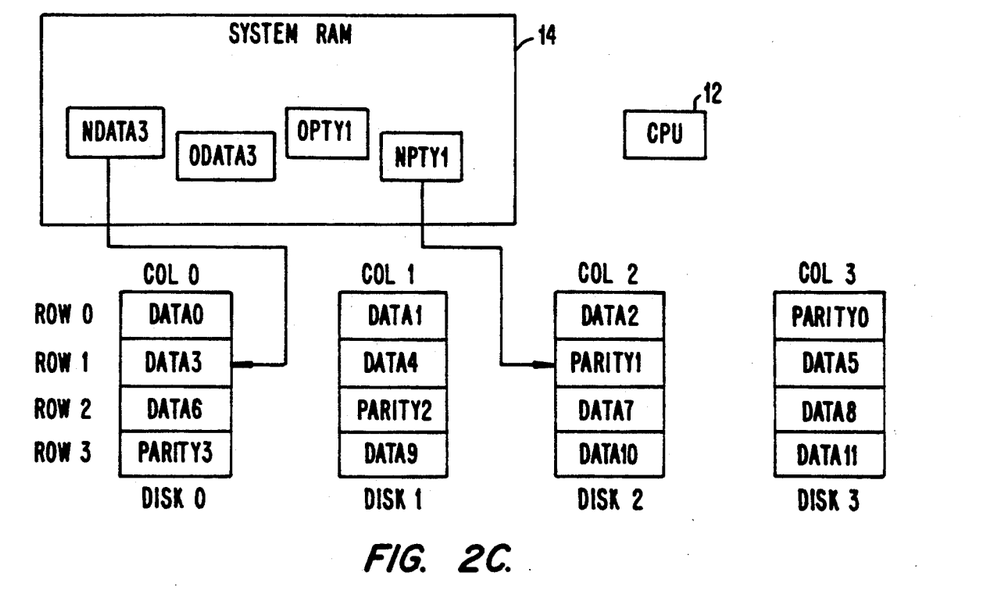

There are several different ways block parity is generated and accessed in RAID systems. A common operation that involves block parity is known as Read-Modify-Write. The Read-Modify-Write method is used when a single block of data for the row is being written. Typically, the block parity for RAID systems is generated using a general purpose Central Processing Unit (CPU) 12 and Random Access Memory (RAM) 14, as shown in FIGS. 2A-2C. FIGS. 2A-2C show how a Read-Modify-Write operation is implemented with a general purpose CPU and RAM.

The Read-Modify-Write operation updates the new data block being written and the parity block for the row. To generate the new parity block requires reading the old data block and the old parity block from the array and exclusive-or'ing the new data block, the old data block, and the old parity block.

FIG. 2A: Allocate Memory and Read Old Data and Parity Blocks

1) Receive request to Write Data3 with new block Ndata3 in System RAM 14.
2) Allocate Blocks Odata3, Opty1 and Npty1 to generate new parity for Row 1.
3) READ Block Data3 from disk store into System RAM Block Odata3.
4) READ Block Parity1 from disk store into System RAM Block Opty1.

FIG. 2B: Generate New Parity Block

5) For i=0 to Block Size
   a) load Ndata3[i] into CPU register 1
   b) load Odata3[i] into CPU register 2
   c) XOR CPU register 1 and CPU register 2, store in CPU register 1
   d) load Opty1[i] into CPU register 2
   e) XOR CPU register 1 and CPU register 2, store in CPU register 1
   f) store CPU register 1 into Npty1[i]

FIG. 2C: Update Data and Parity Blocks on Disk

6) WRITE From System RAM Ndata3 to Block Data3 on disk
7) WRITE From System RAM Npty1 to Block Parity1 on disk

SUMMARY OF THE INVENTION

The present invention provides a dedicated memory circuit which supports the generation of parity data in connection with the storing of data. This improved memory circuit allows the parity generation to be done remotely from the CPU while consuming less time. A memory array is provided with its data output being connected to combinational logic. Another input to the combinational logic is for external data. The data already in the array and the new data are combined through the combinational logic, preferably an exclusive or arrangement, to produce the parity data which is then returned to the memory array. A latch is provided between the exclusive-or logic and the memory array data lines to allow isolation of the data during the two cycles of the read out of the array and the write back to the array after the exclusive-or operation.

Special control logic enables the data from the exclusive-or to be written back into the memory array during an exclusive write operation period. The control logic can also enable normal read and write operations to the memory array, which can be a standard static RAM (SRAM) or a standard dynamic RAM (DRAM). A transceiver is also provided between the external data I/O and the memory array data I/O and is controlled by the control logic. This transceiver circuit allows either normal data input and output, or the routing of data through the exclusive-or logic. In a preferred embodiment, all of these components are combined with the RAM components on a single "parity memory" chip, called a "PRAM" herein. Alternately, a separate logic chip or discrete logic can be used.

The apparatus of the present invention provides several advantages over the prior art approach. The PRAM solution requires less memory in order to accomplish the parity operation. The parity operation can be concluded in fewer cycles, thus allowing it to be accomplished in a much shorter time. In the prior art approaches, the data is pulled off the disk and stored in RAM, then the CPU does the parity calculation on the data in the RAM. This invention allows the parity operation to be accomplished during the step of pulling the data off the disk and storing it in RAM, eliminating the need for later CPU calculations. The present invention can also be placed near or in the hard disk drive, eliminating the need for data transfers across the SCSI and HBA buses.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 3:
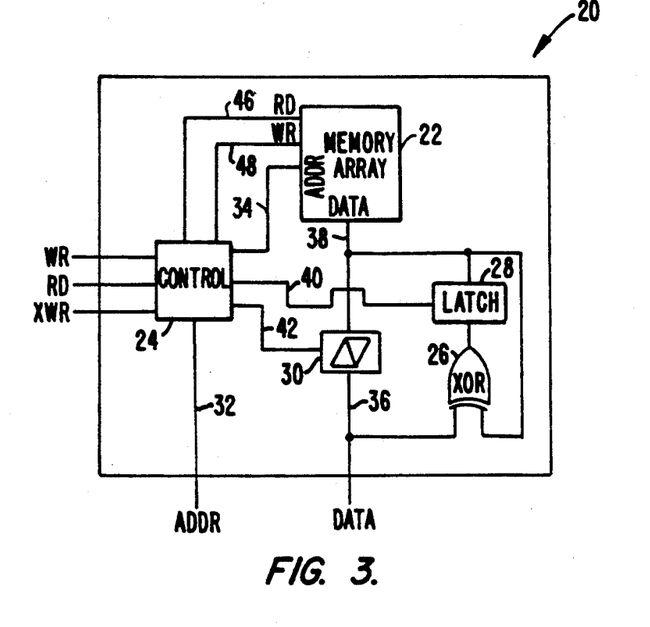
FIG. 3 is a block diagram of a parity generating memory circuit according to the present invention.

FIG. 3 is a block diagram of a PRAM memory circuit according to the present invention. The circuit is preferably included on a single semiconductor chip 20. Chip 20 includes a memory array 22, such as a standard RAM. Alternately, a standard RAM chip could be used in conjunction with a separate logic chip or discrete logic which performs the other logic functions of memory circuit 20.

The surrounding logic of PRAM 20 includes a control circuit 24, exclusive-or (XOR) logic 26, a latch 28 and a transceiver 30. Addresses are provided to the circuit through external address lines 32 which are passed through control circuit 24 to memory array address input lines 34. External data input/output lines 36 are connected to transceiver 30 and one input of exclusive-or logic 26. The other side of transceiver 30 is connected to the memory array data input/output lines 38, which are also connected to an output of latch 28 and another input of exclusive-or logic 26. Control logic 24 provides a control signal on a line 40 to latch 28 and a control signal on a line 42 to transceiver 30.

Figure 4:
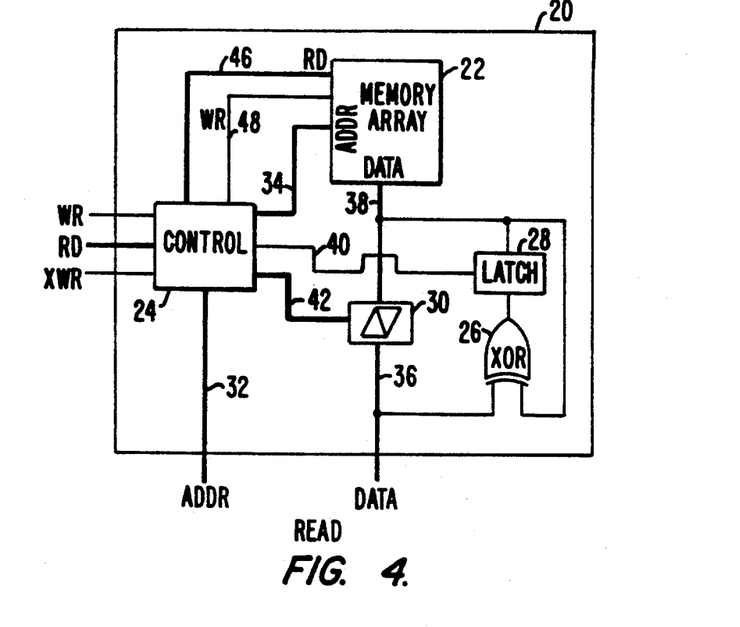
FIG. 4 is a block diagram of the circuit of FIG. 3 illustrating a read operation.
Figure 5:
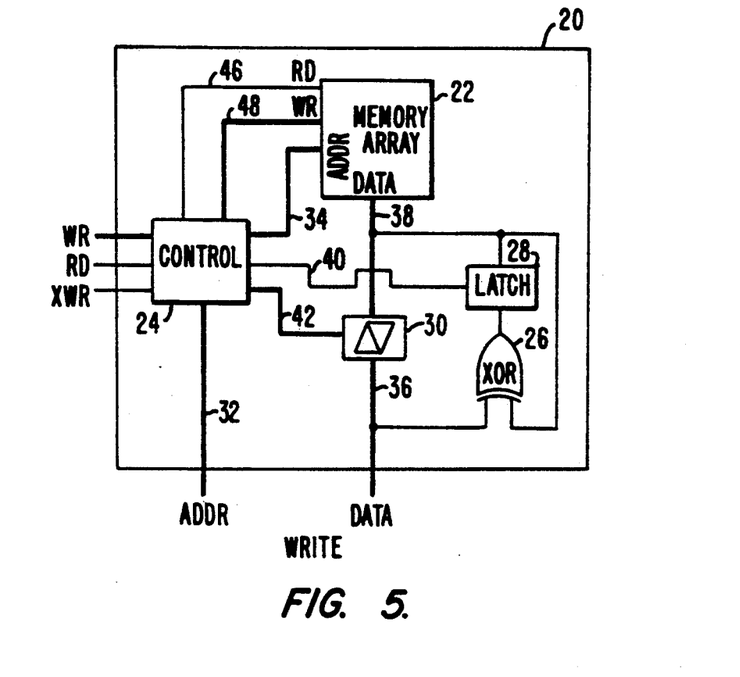
FIG. 5 is a block diagram of the circuit of FIG. 3 illustrating a write operation.
Figure 6A:
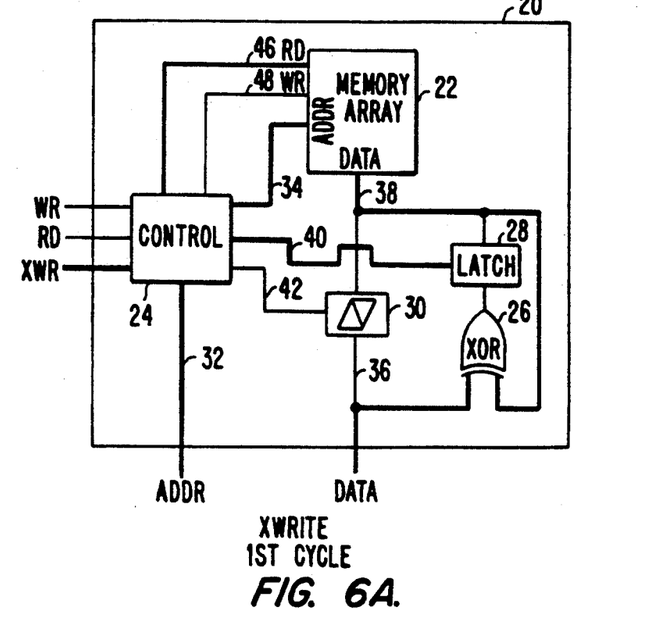
FIGS. 6A and 6B are block diagrams of the circuit of FIG. 3 illustrating the two cycles of an exclusive write operation.
Figure 6B:
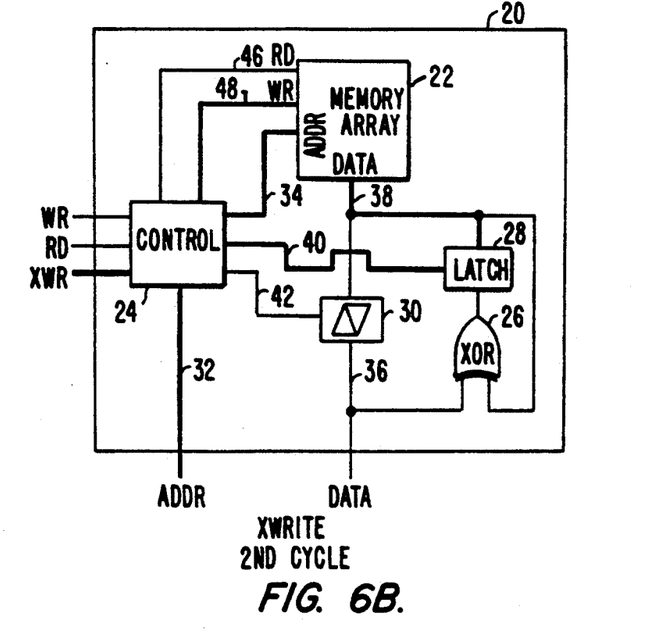

The operation of the circuit of FIG. 3 is illustrated for READ, WRITE and exclusive write operations in FIGS. 4-6. FIG. 4 illustrates a read operation with the lines being used indicated in bold. The read (RD) input of control circuit 24 is activated, and external addresses and data are provided on lines 32 and 36, respectively. A read signal on a line 46 is provided from control logic 24 to memory array 22. Control circuit 24 activates transceiver 30 by sending the control signal on line 42 in response to the RD command. A control circuit 24 passes the addresses through to memory array address input lines 34. Data is read out of memory array 22 via internal input/output bus 38 through transceiver 30 to external data input/output lines 36, with the transceiver being activated in this direction.

FIG. 5 illustrates a standard write operation. The write input (WR) is activated, and control circuit 24 passes addresses through as in FIG. 4. A write signal on line 48 is provided to memory array 22 by control logic 24. Again, transceiver 30 is enabled, this time in the opposite direction to allow data to pass from external bus 36 to internal bus 38 to be written into memory array 22. As can be seen, in both FIGS. 4 and 5, the latch 28 is not activated. Although the data is presented to the exclusive-or logic input, it is not allowed to propagate back and interfere with the other operations, and is thus effectively isolated.

FIGS. 6A and 6B illustrate an exclusive write operation. The exclusive write control input (XWR) to control circuit 24 is activated as shown in FIG. 6A. FIG. 6A shows the first cycle in which the addresses on line 32 are passed through to the internal address lines 34. Transceiver 30 is deactivated and the input to latch 28 is activated by line 40. A read signal on a line 46 is provided from control logic 24 to memory array 22. Thus, exclusive-or logic 26 will combine the data read out of array 22 with the new data presented on the input/output line 36. The result is provided to latch 28.

In a second cycle, illustrated in FIG. 6B, the output of latch 28 is enabled and written into memory array 22. Again, transceiver 30 is turned off, isolating the internal and external data buses. A write signal on line 48 is provided to memory array 22 by control logic 24.

PRAM is a random access memory device that supports READ, WRITE and XWRITE operations. The READ and WRITE operations are functionally identical to traditional random access memory devices. The XWRITE operation stores the result of the exclusive-or operation of the data stored at the memory location being XWRITTEN and the new data.

Figure 7A:
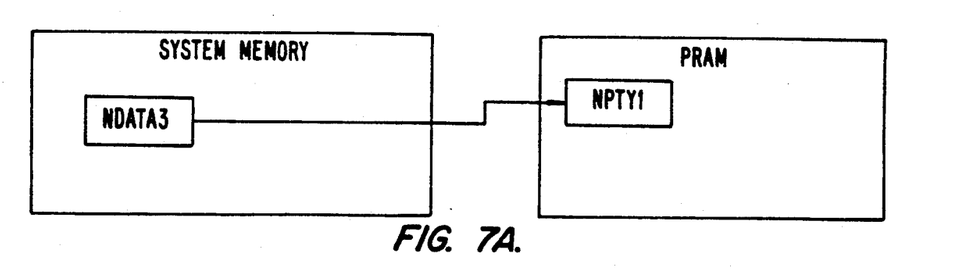
FIGS. 7A-7C are diagrams of a read-modify-write operation according to the present invention.
Figure 7B:
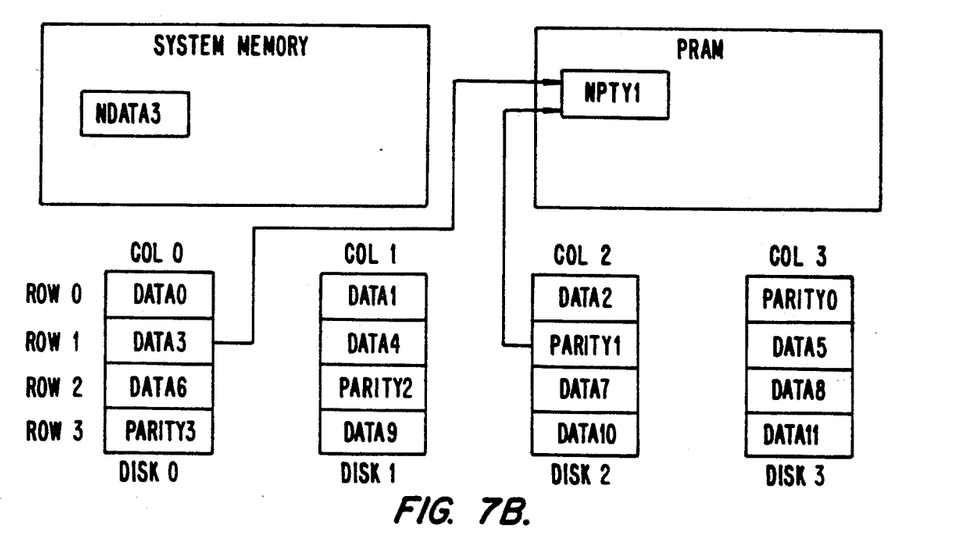
Figure 7C:
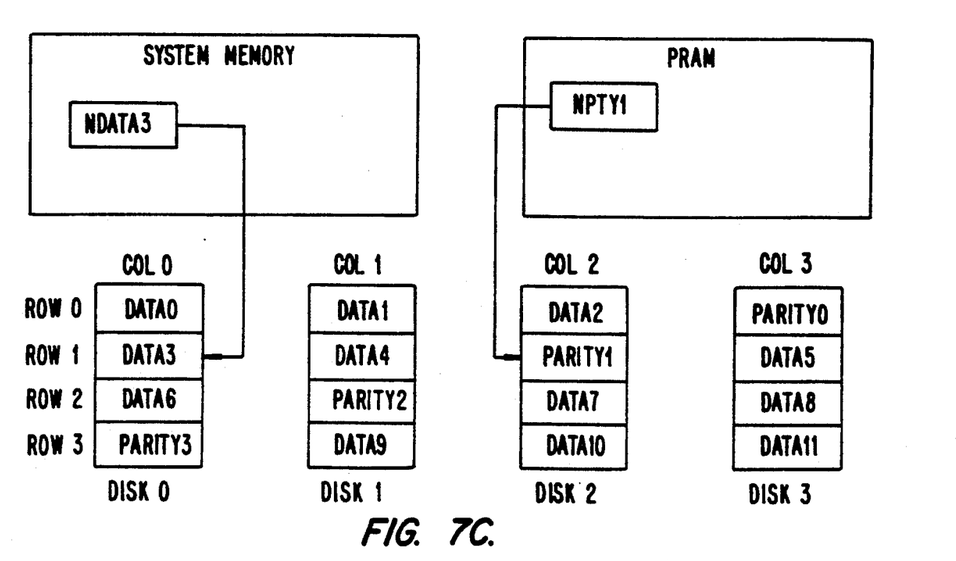

The XWRITE operation is useful for generating a block of parity data from two or more blocks of data. FIGS. 7A-7C show how a Read-Modify-Write operation is implemented with a PRAM according to the present invention.

FIG. 7A: Allocate PRAM Block and Copy New Data to PRAM

1) Request to update Data3 with new block NDATA3 in System RAM.
2) Allocate Block Npty1 in PRAM to generate new parity for Row 1.
3) Copy Ndata3 from System Memory, WRITE to Npty1 in PRAM.

FIG. 7B

4) READ Block Data3 from disk, XWRITE to Npty1 Block in PRAM.
5) READ Block Parity1 from disk, XWRITE to Npty1 Block in PRAM.

FIG. 7C: Update Data and Parity Blocks on Disk

6) READ from System Memory Ndata3, WRITE to Block Data3 on Disk 0.
7) READ from PRAM Npty1, WRITE to Block Parity1 on Disk 2.

The PRAM approach to Block Parity generation has several advantages over the general purpose CPU and RAM approach. PRAM reduces memory requirements, system bus utilization, and CPU utilization. In the preceding example the CPU/RAM solution requires three blocks of memory to be allocated to generate parity. The PRAM solution requires 1 block of PRAM. The CPU/RAM solution requires 8 blocks of data to be moved across the system's bus; 2 Blocks from disk to RAM; 3 Blocks from RAM to CPU; 1 Block from CPU to RAM; 2 Blocks from RAM to disk. The PRAM solution requires 5 Blocks of data to be moved across the system's bus: 1 Block from RAM to PRAM; 2 Blocks from disk to PRAM; and 2 Blocks from PRAM to disk.

SRAM is fast enough to allow the operation to be done within a single disk revolution, and some DRAMs have fast Read-Modify-Write circuitry. Other fast memory could be used as well.

Figure 8A:
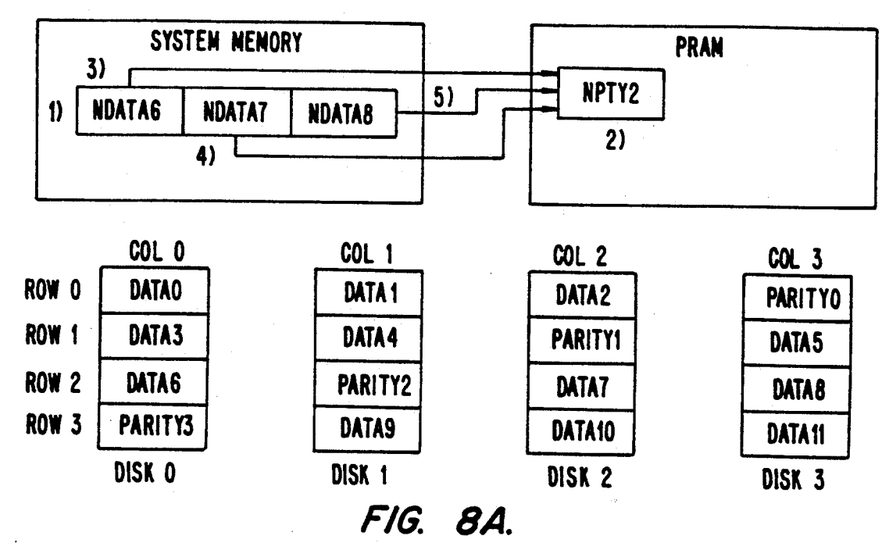
FIGS. 8A-8B are diagrams of a reconstruct-write operation using the present invention.
Figure 8B:
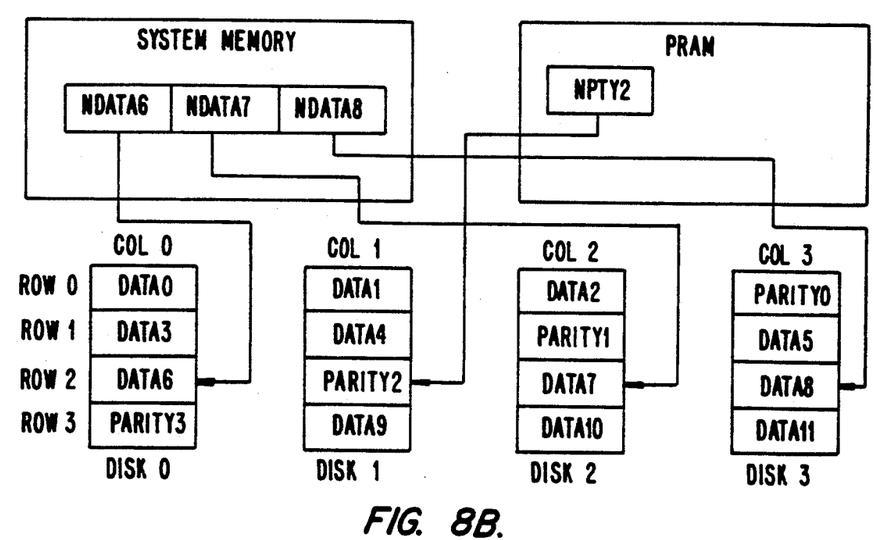

FIGS. 8A and 8B illustrate a Reconstruct-Write Command with PRAM.

FIG. 8A

1) Receive command to WRITE Blocks Ndata6 through NData 8 to Blocks Data6 through Data8 of Row 2.
2) Allocate Block Npty2 in PRAM to generate new parity for Row 2.
3) READ Ndata6 from System Memory, WRITE to Npty2 in PRAM.
4) READ Ndata7 from System Memory, XWRITE to Npty2 in PRAM.
5) READ Ndata8 from System Memory, XWRITE to Npty2 in PRAM.

FIG. 8B

7) READ Ndata6 from System Memory, WRITE to Block Data6 on Disk 0.
8) READ Ndata7 from System Memory, WRITE to Block Data7 on Disk 2.
9) READ Ndata8 from System Memory, WRITE to Block Data8 on Disk 3.
9) READ Npty2 from PRAM, WRITE to Block Parity2 on Disk 1.

Other commands for Hard Disk Drives using the invention are as follows:

Read-Write-Return-Parity Command

A write command that stores on the media the new data and returns the result of the old data XORed with the new data.

Decode Command
Go to data-in phase, write data to PRAM buffer (a portion of the memory array: the parity buffer)
DMA a copy of the new data (to be written) into second PRAM buffer (another portion of the memory array)
Schedule a read for the requested block off media (disk)
Read old data off media, XWRITE to fist PRAM buffer
Schedule a write of the requested block to media
Rearbitrate for bus, return parity out of first PRAM buffer
Read data out of second PRAM buffer, store to media
Rearbitrate for status phase

Read-Write-Store-Parity Command

A write command that stores on media the result of the new data XORed with the old data.

Decode command
Go to data-in phase, write data to PRAM buffer (the parity buffer)
Schedule a read for the requested block off media
Read old data off media, XWRITE to PRAM buffer
Schedule a write of the requested block to media
Read data out of PRAM buffer, store to media
Rearbitrate for status phase As will be understood by those familiar with the art, the present invention may be embodied in another specific forms without departing from the spirit or essential characteristics thereof. For example, the entire circuitry can be placed on a single PRAM memory chip, or a separate SRAM or DRAM or other memory chip and dedicated ASIC chip with the other logic could be used. Also, the memory array might have dual purpose data input/output lines, or separate input and output lines. Accordingly, the disclosure of the preferred embodiment of the invention is intended to be illustrative, but not limiting, of the scope of the invention which is set forth in the following claims.

What is claimed is:

1. A memory circuit comprising:
   a memory array for storing a plurality of bits, said memory array having address inputs and data input and output lines;
   a logic circuit having first inputs coupled to said memory array data output lines and second inputs coupled to external data input/output lines;
   latching means, coupled between an output of said logic circuit and said memory array data input lines;
   transceiver means, coupled between said memory array data input lines and output lines and said external data input/output lines, for disabling the flow of data between said external data input/output lines and said memory array data input lines and output lines in response to a transceiver disable control signal; and
   control means, having an external control input for receiving an exclusive write signal and a transceiver control output coupled to said transceiver means, for providing said transceiver disable control signal to said transceiver means in response to said exclusive write signal.

2. The memory circuit of claim 1 wherein said control means further comprises a read input line and a write input line, said control means generating a transceiver enable control signal on said transceiver control output in response to a read signal on said read input line or a write signal on said write input line.

3. A memory circuit for generating block parity from multiple bytes of data comprising:
   a memory array for storing a plurality of bits, said memory array having address inputs and data input and output lines;
   a logic circuit having first inputs coupled to said memory array data output lines for receiving a first data byte and second inputs coupled to external data input lines for receiving a second data byte, said logic circuit producing a parity byte from the combination of said first and second data bytes; and
   latching means, coupled between an output of said logic circuit and said memory array data input lines, for isolating said parity byte from said first and second data bytes;
   whereby parity generation is done with said memory circuit remotely from an external processor.

4. The memory circuit of claim 3 wherein said logic circuit is an exclusive OR logic circuit.

5. The memory circuit of claim 3 further comprising control means, having an external exclusive write control input and a control output line coupled to said latching means, for allowing data from said memory array data output lines to be combined with data from said external data input lines in said logic circuit during a first cycle to produce combined data and enabling an output of said combined data in said latching means to said memory array data input lines in a second cycle.

6. The memory circuit of claim 3 wherein said memory array data input lines and data output lines are the same data input/output lines.

7. The memory circuit of claim 3 wherein said memory circuit is contained on a single semiconductor chip.

8. The memory circuit of claim 3 wherein said external data input lines are external data input/output lines, and further comprising:

transceiver means, coupled between said memory array data input lines and output line and said external data input/output lines, for disabling the flow of data between said external data input/output lines and said memory array data input lines and output lines in response to a transceiver disable control signal; and control means, having an external control input for receiving an exclusive write signal and a transceiver control output coupled to said transceiver means, for providing said transceiver disable control signal to said transceiver means in response to said exclusive write signal.

9. The memory circuit of claim 8 wherein said control means further comprises a read input line and a write input line, said control means generating a transceiver enable control signal on said transceiver control output in response to a read signal on said read input line or a write signal on said write input line.

10. A memory circuit comprising:

a memory array for storing a plurality of bits, said memory array having address inputs and data input/output lines;

an exclusive OR logic circuit having first inputs coupled to said memory array data input/output lines and second inputs coupled to external data input/output lines;

latching means, coupled between an output of said logic circuit and said memory array data input/output lines; and control means, having an external exclusive write control input and a control output line coupled to said latching means, for allowing data from said memory array data input/output lines to be combined with data from said external data input/output lines in said exclusive OR logic circuit during a first cycle to produce combined data and enabling an output of said combined data in said latching means to said memory array data input lines in a second cycle.

11. A memory circuit comprising:

a memory array for storing a plurality of bits, said memory array having address inputs and data input/output lines;

an exclusive OR logic circuit having first inputs coupled to said memory array data input/output lines and second inputs coupled to external data input/output lines;

latching means, coupled between an output of said logic circuit and said memory array data input/output lines;

transceiver means, coupled between said memory array data input/output lines and said external data input/output lines, for disabling the flow of data between said external data input/output lines and said memory array data input/output lines in response to a transceiver disable control signal; and control means, having an external exclusive write control input and a control output line coupled to said latching means, for allowing data from said memory array data input/output lines to be combined with data from said external data input/output lines in said exclusive OR logic circuit during a first cycle to produce combined data and enabling an output of said combined data in said latching means to said memory array data input/output lines in a second cycle;

said control means having a transceiver control output coupled to said transceiver means for providing said transceiver disable control signal to said transceiver means in response to said exclusive write signal;

said control means further comprising a read input line and a write input line, said control means generating a transceiver enable control signal on said transceiver control output in response to a read signal on said read input line or a write signal on said write input line.

* * * * *